(12) United States Patent
Tai

(10) Patent No.: US 8,334,798 B2
(45) Date of Patent: Dec. 18, 2012

(54) REMOTE CONTROL UNIT FOR CONTROLLING A PLURALITY OF DEVICES AND CORRESPONDING METHODS OF USING THE REMOTE CONTROL DEVICE

(76) Inventor: Jiun Pink Tai, Johor (MY)

( * ) Notice: Subject to any disclaimer, the term of this patent is extended or adjusted under 35 U.S.C. 154(b) by 222 days.

(21) Appl. No.: 12/919,858

(22) PCT Filed: Dec. 24, 2009

(86) PCT No.: PCT/MY2009/000215
§ 371 (c)(1),
(2), (4) Date: Aug. 27, 2010

(87) PCT Pub. No.: WO2011/078647
PCT Pub. Date: Jun. 30, 2011

(65) Prior Publication Data
US 2011/0217046 A1  Sep. 8, 2011

(51) Int. Cl.
*G08C 23/04* (2006.01)
(52) U.S. Cl. ...................................... 341/176; 340/12.3
(58) Field of Classification Search .................. 340/12.3; 341/176; 348/734
See application file for complete search history.

(56) References Cited

U.S. PATENT DOCUMENTS

| 6,717,528 | B1 | 4/2004 | Burleson et al. | |
|---|---|---|---|---|
| 6,812,881 | B1 | 11/2004 | Mullaly et al. | |
| 7,167,122 | B2 | 1/2007 | Stefanik | |
| 7,329,021 | B1 | 2/2008 | Hoffman | |
| 2009/0002219 | A1* | 1/2009 | Arling et al. | 341/176 |
| 2009/0322582 | A1* | 12/2009 | Baugh et al. | 341/176 |

OTHER PUBLICATIONS

International Search Report and Written Opinion for IA No. PCT/MY2009/000215 issued by Australian Patent Office Apr. 23, 2010; 8 pages.

* cited by examiner

*Primary Examiner* — Steven J Mottola
(74) *Attorney, Agent, or Firm* — Summa, Additon & Ashe, P.A.

(57) ABSTRACT

There are provided a remote control unit configurable to be used to control a plurality of devices together with corresponding methods to use the remote control. Advantageously, the transmission of both master IR signals and an illumination beam from the remote control unit is adjustable for varying a field of coverage of the master IR signals, with at least one of the plurality of devices within the field of coverage receiving the master IR signals allowing the at least one of the plurality of devices to be controlled.

30 Claims, 3 Drawing Sheets

|  | DVD Player | Blu-Ray Player | Air Conditioner | Fan |
|---|---|---|---|---|
| Play | √ | √ | - | - |
| Stop | √ | √ | - | - |
| Next track | √ | √ | - | - |
| Power on | √ | √ | √ | √ |
| Power off | √ | √ | √ | √ |
| Fan spd increase | - | - | √ | √ |
| Fan spd decrease | - | - | √ | √ |

REMOTE CONTROL UNIT FOR CONTROLLING A PLURALITY OF DEVICES AND CORRESPONDING METHODS OF USING THE REMOTE CONTROL DEVICE

CROSS-REFERENCE TO PRIORITY APPLICATION

This application hereby claims the benefit of the commonly assigned PCT Patent Application Serial No. PCT/MY2009/000215 (filed Dec. 24, 2009), which is hereby incorporated by reference in its entirety.

FIELD OF INVENTION

This invention relates in general to remote control units, specifically remote control units used for controlling a plurality of devices and corresponding methods pertaining to use of the aforementioned remote control units.

BACKGROUND

Remote control units are commonly bundled together with many forms of devices given the widespread expectation that they are provided by manufacturers of the devices for users' convenience during use of the devices. The many forms of devices may include, for example in a non-limiting manner, televisions, air-conditioners, fans, VCRs, multimedia-content players/recorders, speakers, television content decoder units, PC-based entertainment units, gaming consoles, lighting devices and so forth. Nowadays, it is unusual for any of the aforementioned devices to be sold without a bundled remote control unit. However, this has consequently led to a situation where there are several remote control units available for use at any instance in time, leading to both a cluttered appearance from the presence of the numerous remote control units and unfortunately, a degree of confusion for the user in relation to determining which remote control unit is able to control which device.

A universal remote control unit typically provides a single remote control unit which is able to control a plurality of devices. Usually, a universal remote control unit includes a selection of a plurality of categories, with each category corresponding to a different device to be controlled. However, a user who wishes to have "pick up and use" usability in relation to the universal remote control unit would not be able to do so in view of the necessity to select an appropriate category (device) in order to control a desired device.

Furthermore, controlling more than one device becomes inconvenient with the necessity to select the appropriate category before the user is able to control the desired devices. While it is undeniable that the universal remote control unit is able to reduce the cluttered appearance by reducing the number of remote control units from several to one, there are still unfavourable issues in relation to the usability of such universal remote control units which are detrimental to a convenience of a user.

The present invention aims to address these issues for the convenience of the users of such universal remote control units.

SUMMARY

In a first aspect, there is provided a remote control unit configurable to be used to control a plurality of devices. The remote control unit includes a micro-controller for controlling functions performed by the remote control unit; an IR transceiver coupled to the micro-controller for both receiving supplementary IR signals and transmitting master IR signals; a memory module coupled to the micro-controller for storing the received supplementary IR signals in a plurality of profiles; a user input interface coupled to the micro-controller for both providing instructions to the micro-controller and for allocating the received supplementary IR signals in at least one command field in each of the plurality of profiles; an illumination source coupled to the micro-controller for providing a visible indication of a location that the IR transceiver is pointed towards, the illumination source being activated when the master IR signals are transmitted; and an adjustable lens assembly for adjusting transmission of both the master IR signals and an illumination beam from the illumination source.

It is advantageous that the transmission of both the master IR signals and the illumination beam is adjustable for varying a field of coverage of the master IR signals, with at least one of the plurality of devices within the field of coverage receiving the master IR signals allowing the at least one of the plurality of devices to be controlled. The illumination source may be able to provide the visible indication at a distance of at least five meters.

The plurality of devices may include, for example, televisions, air-conditioners, fans, VCRs, multimedia-content players/recorders, speakers, television content decoder units, PC-based entertainment units, gaming consoles, lighting devices and so forth.

The visible indication may preferably be in a form of a boundary of illumination and the boundary of illumination may denote the field of coverage of the master IR signals in view that the IR transceiver and the illumination source are adjacent to one another.

Each of the plurality of profiles may be associated with one of the plurality of devices, where each of the plurality of profiles includes a plurality of command fields associated with a plurality of commands for the associated device. The at least one command field may include, for example, power up, power down, play, stop, pause, volume increase, volume decrease, next track, previous track, fan speed increase, fan speed decrease, thermostat temperature increase, thermostat temperature decrease, channel increase, channel decrease, light intensity increase, light intensity decrease and so forth.

The master IR signals may include stored supplementary IR signals from identical command fields for the plurality of devices, where the identical command fields may be determined by the micro-controller. The stored supplementary IR signals in the master IR signals may be transmitted in a form such as, for example, sequentially with a time delay, sequentially without a time delay, altogether in a single transmission and so forth. The supplementary IR signals may originally be transmitted from the plurality of devices.

The user input interface may be in a form such as, for example, a user definable touch screen interface, a pre-defined touch screen interface, a plurality of control keys and the like.

Preferably, the lens assembly may be adjustable in a manner where a focusing lens of the lens assembly is movable in a forwards and backwards direction. Furthermore, the adjustable lens assembly may include a plurality of interconnected assembly structures and also may include more than one lens.

In a second aspect, there is provided a method for using a remote control unit to control a plurality of devices. The method includes receiving supplementary IR signals from the plurality of devices through an IR transceiver of the remote control unit; allocating the received supplementary IR signals in at least one command field in each of a plurality of profiles;

storing the received supplementary IR signals in a memory module of the remote control unit; transmitting master IR signals through the IR transceiver; illuminating with an illumination beam from an illumination source of the remote control unit, a location that the IR transceiver of the remote control unit is pointed towards with a visible indication; and adjusting transmission of both the master IR signals and the illumination beam with an adjustable lens assembly of the remote control unit. It should be appreciated that an order of the aforementioned method as described may be varied without departing from the present invention.

Advantageously, the transmission of both the master IR signals and the illumination beam may be adjustable for varying a field of coverage of the master IR signals, with at least one of the plurality of devices within the field of coverage receiving the master IR signals allowing the at least one of the plurality of devices to be controlled. The illumination source may preferably be able to provide the visible indication at a distance of at least five meters.

The plurality of devices may be selected from, for example, televisions, air-conditioners, fans, VCRs, multimedia-content players/recorders, speakers, television content decoder units, PC-based entertainment units, gaming consoles, lighting devices and the like.

The visible indication may be in a form of a boundary of illumination, where an area bounded by the boundary of illumination denotes the field of coverage of the master IR signals.

It is preferable that each of the plurality of profiles is associated with one of the plurality of devices where each of the plurality of profiles includes a plurality of command fields associated with a plurality of commands for the associated device. The at least one command field may include, for example, power up, power down, play, stop, pause, volume increase, volume decrease, next track, previous track, fan speed increase, fan speed decrease, thermostat temperature increase, thermostat temperature decrease, channel increase, channel decrease, light intensity increase, light intensity decrease and so forth.

The master IR signals may include stored supplementary IR signals from identical command fields for the plurality of devices, where the identical command fields may be determined by a micro-controller of the remote control unit. The stored supplementary IR signals in the master IR signals may preferably be transmitted in a form such as, for example sequentially with a time delay, sequentially without a time delay, altogether in a single transmission and so forth.

It is preferable that allocating the received supplementary IR signals may be performed using a user input interface of the remote control unit such as, for example, a user definable touch screen interface, a pre-defined touch screen interface, a plurality of control keys and the like.

The lens assembly may preferably be adjustable in a manner where a focusing lens of the lens assembly is movable in a forwards and backwards direction. Furthermore, the adjustable lens assembly may include a plurality of interconnected assembly structures and also may include more than one lens.

DESCRIPTION OF FIGURES

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
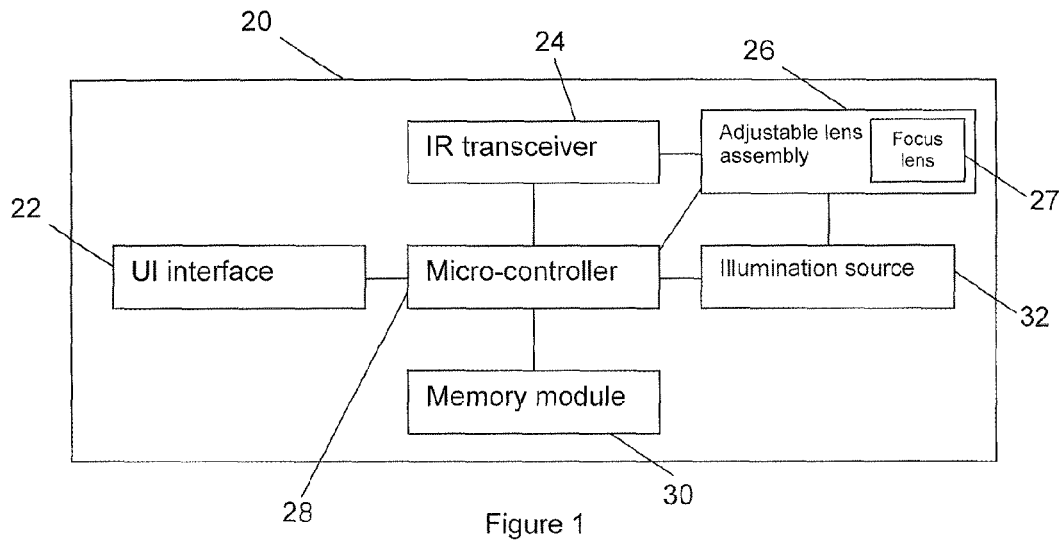
FIG. 1 shows a schematic view of a remote control unit of the present invention.
Figure 3:
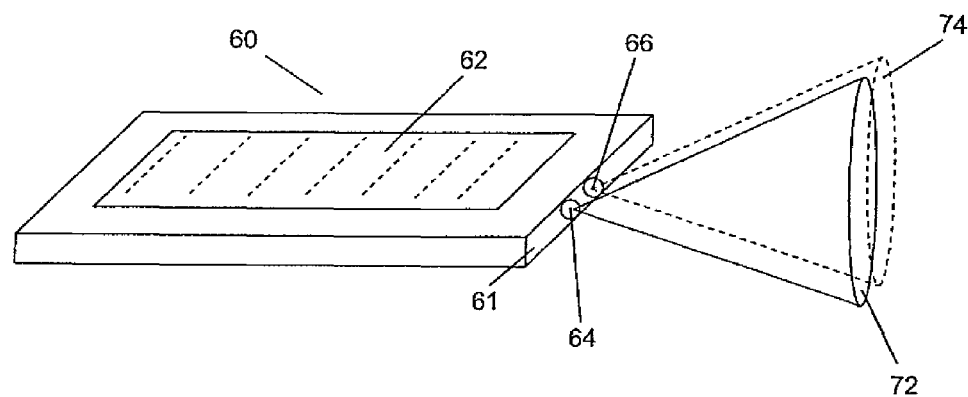
FIG. 3 shows a perspective view of a first embodiment of the remote control unit of FIG. 1.
Figure 4:
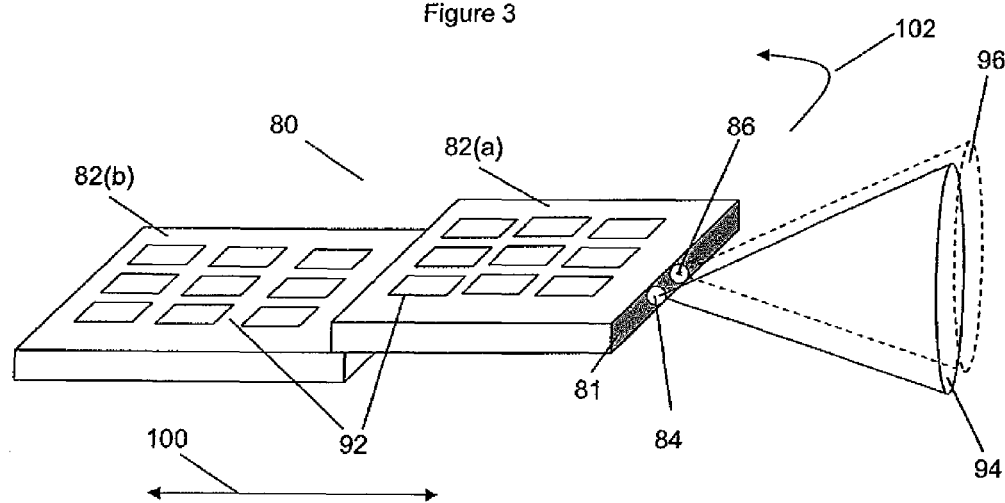
FIG. 4 shows a perspective view of a second embodiment of the remote control unit of FIG. 1.
Figure 5:
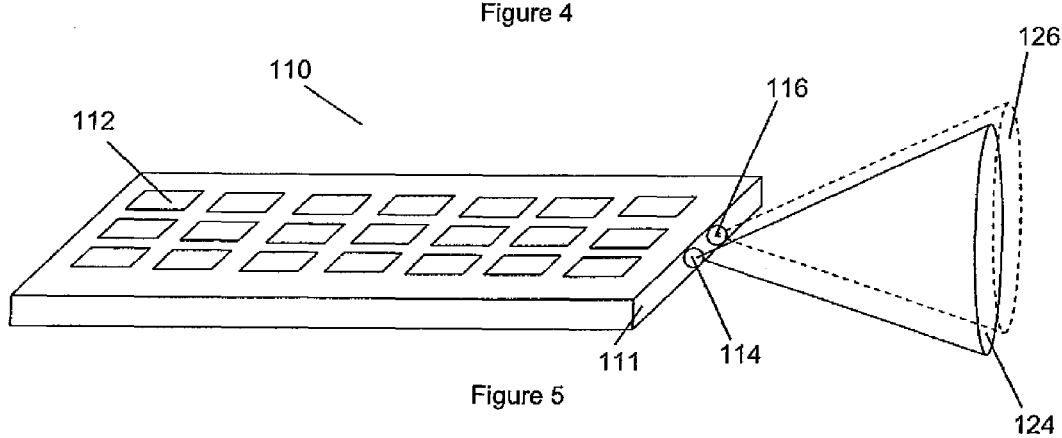
FIG. 5 shows a perspective view of a third embodiment of the remote control unit of FIG. 1.

Referring to FIG. 1, there is shown a schematic view of a remote control unit 20 which is configurable to be used to control a plurality of devices. The remote control unit 20 may be in a physical form as shown for purely illustrative purposes in FIGS. 3, 4 and 5. It should be appreciated that the remote control unit 20 should not be limited to the physical forms as shown in FIGS. 3, 4 and 5. The remote control unit 20 will be described in relation to its constituent components and the physical forms where appropriate in the subsequent paragraphs. The plurality of devices may include, for example, televisions, air-conditioners, fans, VCRs, multimedia-content players/recorders, speakers, television content decoder units, PC-based entertainment units, gaming consoles, lighting devices and the like.

In a preferred embodiment, the remote control unit 20 includes a micro-controller 28, the micro-controller 28 being any suitable data processing unit for controlling functions performed by the remote control unit 20. The remote control unit 20 also includes an IR transceiver 24 coupled to the micro-controller 28 for both receiving supplementary IR signals and transmitting master IR signals. The IR transceiver 24 is also shown as 66 in FIG. 3, as 86 in FIG. 4 and as 116 in FIG. 5. It should be appreciated that the IR transceiver 24 may be replaced by an IR receiver and an IR transmitter combination of components. It is appreciated that whenever the combination of the IR receiver and the IR transmitter is employed, both the IR receiver and the IR transmitter may be physically located either substantially close to one another or spaced apart in the remote control unit 20. The supplementary IR signals are typical device control signals transmitted from the plurality of devices to the remote control unit 20. Due to the nature of IR signals, there needs to be a direct unblocked path for transmission of the IR signals from each of the plurality of devices to the IR transceiver 24. The range of the supplementary IR signals would depend on an intensity of the supplementary IR signals. The supplementary IR signals are subsequently stored in the remote control unit 20 so that the supplementary IR signals can be replicated at a later juncture by the remote control unit 20. The supplementary IR signals may be stored in either modulated or demodulated form, whereby the supplementary IR signals are processed using a known code reduction algorithm. Further details with regard to this aspect will be provided in subsequent paragraphs.

Figures 6, 7:
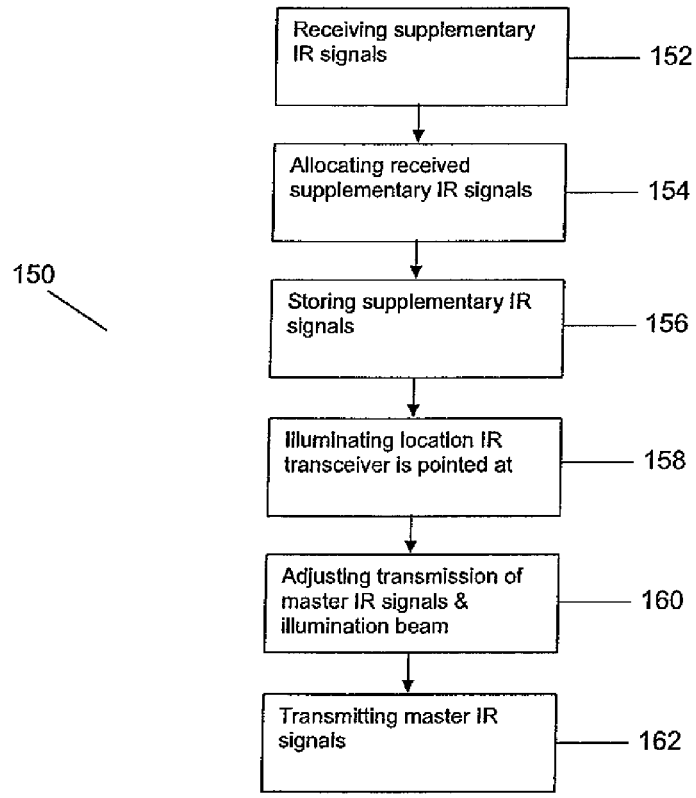
FIG. 6 shows a sample look-up table used in the remote control unit of FIG. 1.
FIG. 7 shows a process flow for a second method of using the remote control unit of FIG. 1.

The remote control unit 20 also includes a memory module 30 coupled to the micro-controller 28 for storing the received supplementary IR signals in a plurality of profiles. The memory module 30 is in a form of non-volatile memory and may be either a hard disk drive or a flash memory module. The memory module 30 may be either built into the remote control unit 20 or removable from the remote control unit 20. Each of the plurality of profiles is associated with one of the plurality of devices. The number of profiles may be dependent on a capacity of the memory module 30, but there should be a minimum of five profiles. Referring to FIG. 6, there is shown a sample look-up table 100 showing various profiles 102 stored in the memory module 30. There are four profiles shown in the look-up table 100, namely, "DVD Player", "Blu-Ray Player", "Air Conditioner", and "Fan". In this instance, the profiles are descriptive of the associated devices, and so are rather self explanatory. It should be appreciated that the profiles may known by numerals (for example, "1", "2", "3", "4"), alphabets (for example, "A", "B", "C", "D") or any other monikers. Further discussions on the look-up table 100 will be provided at subsequent paragraphs.

There is also a user input interface 22 coupled to the micro-controller 28 to enable a user to both provide instructions to the micro-controller 28 and to enable the user to allocate the received supplementary IR signals in at least one command field in each of the plurality of profiles. The user input interface 22 may be in a form such as, for example, a user definable touch screen interface (62 in FIG. 3), a pre-defined touch screen interface, and a plurality of control keys (92 in FIGS. 4 and 112 in FIG. 5). Each of the plurality of profiles includes a plurality of command fields associated with a plurality of commands for the associated device. The at least one command field may include, for example, power up, power down, play, stop, pause, volume increase, volume decrease, next track, previous track, fan speed increase, fan speed decrease, thermostat temperature increase, thermostat temperature decrease, channel increase, channel decrease, light intensity increase, light intensity decrease, and so forth.

During a process of inputting the supplementary IR signals into the remote control unit 20, the user input interface 22 may be used in a manner of, in any order, selecting a first control (for example, either virtual key or physical key) on the user input interface 22, and associating the received supplementary IR signals with the first control such that when the user actuates the first control, the received supplementary IR signals are transmitted as part of the master IR signals via the IR transceiver 24. The user may also use the user input interface 22 to input information relating to a source of the supplementary IR signals, which is useful for the generation of the look-up table 100 of FIG. 6. The user input interface 22 may also be for allocating the received supplementary IR signals in at least one command field in each of the plurality of profiles in the look-up table 100.

Referring to FIG. 6, there is shown the sample look-up table 100 showing various command fields 104. The command fields 104 may be either pre-defined or defined by the user using the user input interface 22. There are seven illustrative command fields 104 shown in the look-up table 100, namely, "Play", "Stop", "Next Track", "Power On", "Power Off", "Fan Speed Increase" and "Fan Speed Decrease". In the look-up table 100, a "√" indicates that the supplementary IR signal for a particular command for a particular device is stored in the remote control unit 20. Similarly, a "-" indicates that the supplementary IR signal for a particular command for a particular device is not stored in the remote control unit 20. Master IR signals transmitted from the IR transceiver 24 include stored supplementary IR signals from identical command fields for the plurality of devices. The identical command fields are determined by the micro-controller 28. In this regard, when a command "play" is actuated by the user via the user input interface 22, the remote control unit 20 transmits "play" commands meant for both the associated DVD player and the associated Blu-Ray player. Similarly, when a command "fan speed increase" is actuated by the user via the user input interface 22, the remote control unit 20 transmits "fan speed increase" commands meant for both the associated air conditioner and the associated fan. The stored supplementary IR signals in the master IR signals may be transmitted in a form such as, for example, sequentially with a time delay, sequentially without a time delay, altogether in a single transmission (single burst) and so forth.

There is also an illumination source 32 in the remote control unit 20 coupled to the micro-controller 28 for providing a visible indication of a location that the IR transceiver 24 is pointed towards. The visible indication is in a form of a boundary of illumination (72 in FIG. 3, 94 in FIG. 4, and 124 in FIG. 5 expressed as solid lines to represent visible light). It should be appreciated that the boundary may be in the form of any shape, such as, for example, quadrilateral, circular, elliptical, star shaped, and so forth. An area bounded by the boundary of illumination (72 in FIG. 3, 94 in FIG. 4, and 124 in FIG. 5 expressed as solid lines to represent visible light) may denote a field of coverage (74 in FIG. 3, 96 in FIGS. 4 and 126 in FIG. 5) of the master IR signals.

The illumination source 32 may be either a bright LED source, or a visible laser source. The illumination source 32 should be able to provide the visible indication at a distance of at least five meters. The illumination source 32 is represented by 64 in FIG. 3, by 84 in FIG. 4 and by 114 in FIG. 5. In a first embodiment, the illumination source 32 is activated when the master IR signals are transmitted from the IR transceiver 24. In the first embodiment, the visible illumination from the illumination source 32 is used to confirm to the user either where or which devices the IR transceiver 24 is pointed towards. In a second embodiment, the illumination source 32 is activated prior to the transmission of master IR signals from the IR transceiver 24. In the second embodiment, the visible illumination from the illumination source 32 is used to initially select either where or which devices the IR transceiver 24 is pointed towards prior to the transmission of master IR signals from the IR transceiver 24.

Referring to FIGS. 3, 4 and 5, the illumination source 64, 84, 114 and the IR transceiver 66, 86, 116 respectively are adjacent and positioned substantially closely to one another. The illumination source 64, 84, 114 and the IR transceiver 66, 86, 116 are positioned substantially closely to one another such that their respective fields of coverage are similar (substantially overlapping). It should be appreciated that the illumination source 32 may be activated independently from the IR transceiver in a manner that the remote control unit 20 is usable as a pointer with reliance on the visible indication.

The remote control unit 20 also includes an adjustable lens assembly 26 for adjusting transmission of both the master IR signals and an illumination beam from the illumination source 32. It should be appreciated that the adjustable lens assembly 26 may include a plurality of interconnected assembly structures and there may be more than one lens in the assembly 26. The adjustable lens assembly 26 may be adjustable in a manner where a focusing lens 27 of the lens assembly is movable in a forwards and backwards direction. The adjustable lens assembly 26 may be adjustable either with or without assistance of an electric motor(s). The adjustable lens assembly 26 may also be controllable by the micro-controller 28. The adjustable lens assembly 26 may allow individual adjustment for each of the illumination source 32 and the IR transceiver 24. The transmission of both the master IR signals and the illumination beam is adjusted using the adjustable lens assembly 26 for varying the field of coverage (74 in FIG. 3, 96 in FIGS. 4, and 126 in FIG. 5 expressed as dashed lines to represent non-visible infra-red) of the master IR signals, with at least one of the plurality of devices within the field of coverage (74 in FIG. 3, 96 in FIGS. 4, and 126 in FIG. 5 expressed as dashed lines to represent non-visible infra-red) receiving the master IR signals.

In this regard, it is advantageous that the remote control unit 20 which has stored the requisite supplementary IR signals in the memory module 30 allows the user to control a plurality of devices without a necessity to personally identify each device on the remote control unit 20. All the user needs to do is to point the IR transceiver 24 of the remote control unit 20 in the direction of a device(s) which the user wishes to control and actuate a desired control on the user input interface 22 and the device(s) would respond in the desired manner. For example, the user only needs to actuate a command of "power on" once and a television, a television content decoder unit, a set of speakers, and an air-conditioning unit may all be powered on if the IR signal receivers of the aforementioned devices are located within the field of coverage (for example, 74 in FIG. 3, 96 in FIG. 4, and 126 in FIG. 5) of the remote control unit 20. It is evident that the remote control unit 20 provides convenience to the user as there's no necessity for the user to select a particular device to be controlled.

Further descriptions of physical embodiments of the remote control unit 20 will now be provided with reference to FIGS. 3, 4 and 5.

FIG. 3 shows a "candy-bar" remote control unit 60 with a user definable touch screen interface 62. The user may be able to define the contents which appear on the touch screen interface 62. For example, the user may choose to have only "power on" and "power off" controls (virtual buttons) on the touch screen interface 62. Alternatively, the user may choose to make available all types of controls on the touch screen interface 62 such that all controls for the plurality of devices are available to be accessed by the user whenever desired. Of course, a "middle ground" selection of only commonly used controls may also be displayed on the touch screen interface 62. The remote control unit 60 may also include an illumination source 64 and an IR transceiver 66 at a first edge 61 of the remote control unit 60, the illumination source 64 and the IR transceiver 66 being adjacent and positioned substantially closely to one another such that their respective fields of coverage are similar (substantially overlapping).

Similarly, FIG. 4 shows a "multi-segment" remote control unit 80 with a plurality of control keys 92. The remote control unit 80 includes a first segment 82(*a*) and a second segment 82(*b*). The remote control unit 80 may be in a slider form, whereby the first segment 82(*a*) slides over the second segment 82(*b*) as denoted by directions shown with double-sided arrow 100. Alternatively, the remote control unit 80 may be in a clam shell form, whereby the first segment 82(*a*) flips onto the second segment 82(*b*) as denoted by a direction shown by curved arrow 102. The plurality of control keys 92 may include all types of controls such that all controls for the plurality of devices are available to be accessed by the user whenever desired. It is appreciated that each of the plurality of control keys 92 may recognize single, double or triple contacts to activate different controls. The plurality of control keys 92 of the "multi-segment" remote control unit 80 may be arranged in a manner whereby the first segment 82(*a*) includes control keys that represent the most commonly accessed controls by a typical user of the remote control unit 80. The remote control unit 80 may also include an illumination source 84 and an IR transceiver 86 at a second edge 81 of the remote control unit 80, the illumination source 84 and the IR transceiver 86 being adjacent and positioned substantially closely to one another such that their respective fields of coverage are similar (substantially overlapping).

In a similar manner, FIG. 5 shows "candy-bar" remote control unit 110 with a plurality of control keys 112. The plurality of control keys 112 may include all types of controls such that all controls for the plurality of devices are available to be accessed by the user whenever desired. It is appreciated that each of the plurality of control keys 112 may recognize single, double or triple contacts to activate different controls. The plurality of control keys 112 of the "candy-bar" remote control unit 110 may be arranged in a manner whereby control keys 112 that represent the most commonly accessed controls by a typical user of the remote control unit 110 have bigger keys (not shown in FIG. 5). The remote control unit 110 may also include an illumination source 114 and an IR transceiver 116 at a third edge 111 of the remote control unit 110, the illumination source 114 and the IR transceiver 116 being adjacent and positioned substantially closely to one another such that their respective fields of coverage are similar (substantially overlapping).

Figure 2:
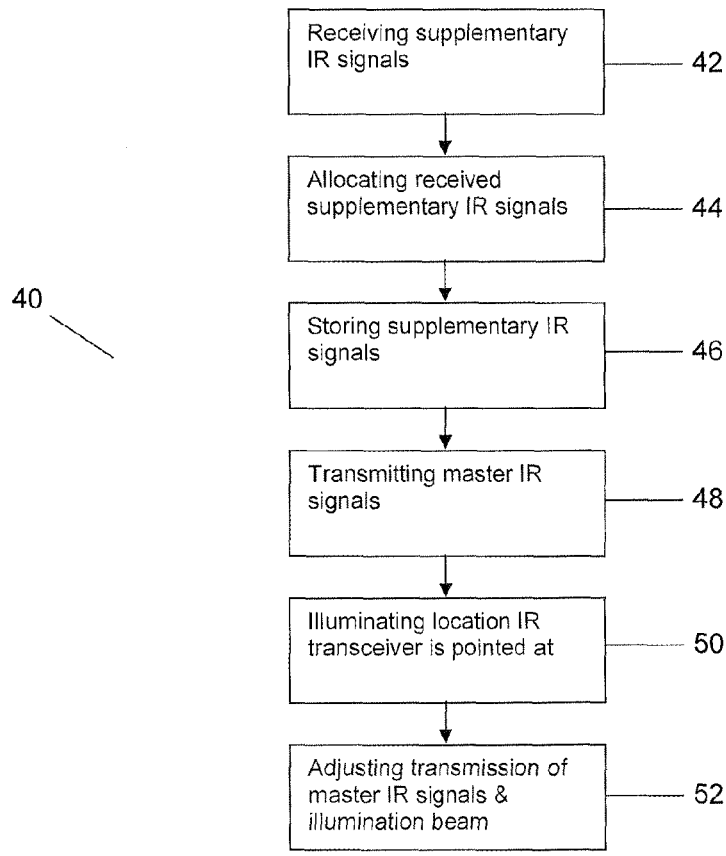
FIG. 2 shows a process flow for a first method of using the remote control unit of FIG. 1.

Referring to FIG. 2, there is provided a process flow for a first method 40 for using a remote control unit for use with a plurality of devices. The first method 40 allows the user to confirm either where or which devices the remote control unit is pointed towards. The method 40 may involve use of the remote control units 20, 60, 80, 110 described in the preceding sections of the description. The plurality of devices may include, for example, televisions, air-conditioners, fans, VCRs, multimedia-content players/recorders, speakers, television content decoder units, PC-based entertainment units, gaming consoles, lighting devices and the like. The method 40 will be described with reference to components of the remote control unit 20 for the sake of clarity.

In a preferred embodiment, the method 40 includes receiving supplementary IR signals (42) from the plurality of devices through an IR transceiver 24 of the remote control unit 20. The IR transceiver 24 is represented by 66 in FIG. 3, by 86 in FIG. 4 and by 116 in FIG. 5. It should be appreciated that the IR transceiver 24 may be replaced by an IR receiver and an IR transmitter combination of components. It is appreciated that whenever the combination of the IR receiver and the IR transmitter is employed, both the IR receiver and the IR transmitter may be physically located either substantially close to one another or spaced apart in the remote control unit 20. The supplementary IR signals are typical device control signals transmitted from the plurality of devices to the remote control unit 20. Due to the nature of IR signals, there needs to be a direct unblocked path for transmission of the IR signals from each of the plurality of devices to the IR transceiver 24. The range of the supplementary IR signals would depend on an intensity of the supplementary IR signals.

During the process of receiving the supplementary IR signals into the remote control unit 20, the user input interface 22 may be used in a manner of, in any order, selecting a first control (for example, either virtual key or physical key) on the user input interface 22, and associating the received supplementary IR signals with the first control such that when the user actuates the first control, the received supplementary IR signals are transmitted as part of the master IR signals via the IR transceiver 24. The user may also use the user input interface 22 to input information relating to a source of the supplementary IR signals, which is useful for the generation of the look-up table 100 of FIG. 6.

Subsequently, the received supplementary IR signals are allocated (44) in at least one command field in each of a plurality of profiles. The number of profiles may be dependent on a capacity of the memory module 30, but there should be a minimum of five profiles. Allocating the received supplementary IR signals is performed using the user input interface 22 of the remote control unit such as, for example, a user definable touch screen interface (62 in FIG. 3), a pre-defined touch screen interface, a plurality of control keys (92 in FIG. 4, and 112 in FIG. 5) and the like. Each of the plurality of profiles includes a plurality of command fields associated with a plurality of commands for the associated device. The command fields 104 may be either pre-defined or defined by the user using the user input interface 22. The at least one command field may include, for example, power up, power down, play, stop, pause, volume increase, volume decrease, next track, previous track, fan speed increase, fan speed decrease, thermostat temperature increase, thermostat temperature decrease, channel increase, channel decrease, light intensity increase, light intensity decrease, and so forth.

Referring to FIG. 6, there is shown a sample look-up table 100 showing various profiles 102 stored in the memory module 30. There are four profiles shown in the look-up table 100, namely, "DVD Player", "Blu-Ray Player", "Air Conditioner", and "Fan". In this instance, the profiles are descriptive of the associated devices, and so are rather self explanatory. It should be appreciated that the profiles may known by numerals (for example, "1", "2", "3", "4"), alphabets (for example, "A", "B", "C", "D") or any other monikers. There are seven command fields 104 shown in the look-up table 100, namely, "Play", "Stop", "Next Track", "Power On", "Power Off", "Fan Speed Increase" and "Fan Speed Decrease". In the look-up table 100, a "√" indicates that the supplementary IR signal for a particular command for a particular device is stored in the remote control unit 20. Similarly, a "-" indicates that the supplementary IR signal for a particular command for a particular device is not stored in the remote control unit 20.

The method 40 includes storing the received supplementary IR signals in a memory module 30 of the remote control unit 20 (46). The memory module 30 is in a form of non-volatile memory and may be either a hard disk drive or a flash memory module. The memory module 30 may be either built into the remote control unit 20 or removable from the remote control unit 20. The supplementary IR signals are stored in the memory module 30 so that the supplementary IR signals can be replicated at a later juncture by the remote control unit 20. The supplementary IR signals may be stored in either modulated or demodulated form, whereby the supplementary IR signals are processed using a known code reduction algorithm.

Subsequently, the method 40 includes transmitting master IR signals through the IR transceiver 24 (48). The master IR signals transmitted from the IR transceiver 24 include stored supplementary IR signals from identical command fields for the plurality of devices. The identical command fields are determined by the micro-controller 28, the micro-controller 28 being any suitable data processing unit for controlling functions performed by the remote control unit 20. In this regard, with reference to FIG. 6, when a command "play" is actuated by the user via the user input interface 22, the remote control unit 20 transmits "play" commands meant for both the associated DVD player and the associated Blu-Ray player. Similarly, when a command "fan speed increase" is actuated by the user via the user input interface 22, the remote control unit 20 transmits "fan speed increase" commands meant for both the associated air conditioner and the associated fan. The stored supplementary IR signals in the master IR signals may be transmitted in a form such as, for example, sequentially with a time delay, sequentially without a time delay, altogether in a single transmission (single burst) and so forth.

Furthermore, the method 40 includes illuminating with an illumination beam from an illumination source 32 of the remote control unit 20, a location that the IR transceiver 24 of the remote control unit 20 is pointed at (50) with a visible indication. The visible indication is in a form of a boundary of illumination (72 in FIG. 3, 94 in FIGS. 4 and 124 in FIG. 5, expressed as solid lines to represent visible light). It should be appreciated that the boundary may be in the form of any shape, such as, for example, quadrilateral, circular, elliptical, star shaped, and so forth. An area bounded by the boundary of illumination (72 in FIG. 3, 94 in FIGS. 4 and 124 in FIG. 5, expressed as solid lines to represent visible light) may denote a field of coverage (74 in FIG. 3, 96 in FIGS. 4 and 126 in FIG. 5, expressed as dashed lines to represent non-visible infra-red) of the master IR signals.

The illumination source 32 may be either a bright LED source, or a visible laser source. The illumination source 32 should be able to provide the visible indication at a distance of at least five meters. The illumination source 32 is represented by 64 in FIG. 3, by 84 in FIG. 4 and by 114 in FIG. 5. The illumination source 32 is activated when the master IR signals are transmitted from the IR transceiver 24. Referring to FIGS. 3, 4 and 5, the illumination source 64, 84, 114 and the IR transceiver 66, 86, 116 respectively are adjacent and positioned substantially closely to one another. The illumination source 64, 84, 114 and the IR transceiver 66, 86, 116 are positioned substantially closely to one another such that their respective fields of coverage are similar (substantially overlapping). It should be appreciated that the illumination source 32 may be activated independently from the IR transceiver in a manner that the remote control unit 20 is usable as a pointer with reliance on the visible indication.

Finally, the method 40 includes adjusting transmission of both the master IR signals and the illumination beam with an adjustable lens assembly 26 of the remote control unit 20 (52). It should be appreciated that the adjustable lens assembly 26 may include a plurality of interconnected assembly structures and there may be more than one lens in the assembly 26. The adjustable lens assembly 26 may be adjustable in a manner where a focusing lens 27 of the lens assembly is movable in a forwards and backwards direction. The adjustable lens assembly 26 may be adjustable either with or without assistance of an electric motor(s). The adjustable lens assembly 26 may also be controllable by the micro-controller 28. The adjustable lens assembly 26 may allow individual adjustment for each of the illumination source 32 and the IR transceiver 24. The transmission of both the master IR signals and the illumination beam is adjusted using the adjustable lens assembly 26 for varying the field of coverage (74 in FIG. 3, 96 in FIGS. 4 and 126 in FIG. 5, expressed as dashed lines to represent non-visible infra-red) of the master IR signals, with at least one of the plurality of devices within the field of coverage (74 in FIG. 3, 96 in FIGS. 4, and 126 in FIG. 5 expressed as dashed lines to represent non-visible infra-red) receiving the master IR signals.

Referring to FIG. 7, there is provided a process flow for a second method 150 for using a remote control unit for use with a plurality of devices. The second method 150 allows the user to initially select either where or which devices the remote control unit is pointed towards. The method 150 may involve use of the remote control units 20, 60, 80, 110 described in the preceding sections of the description. The plurality of devices may include, for example, televisions, air-conditioners, fans, VCRs, multimedia-content players/recorders, speakers, television content decoder units, PC-based entertainment units, gaming consoles, lighting devices and the like. The method 150 will be described with reference to components of the remote control unit 20 for the sake of clarity.

In a preferred embodiment, the method 150 includes receiving supplementary IR signals (152) from the plurality of devices through an IR transceiver 24 of the remote control unit 20. The IR transceiver 24 is represented by 66 in FIG. 3, by 86 in FIG. 4 and by 116 in FIG. 5. It should be appreciated that the IR transceiver 24 may be replaced by an IR receiver and an IR transmitter combination of components. It is appreciated that whenever the combination of the IR receiver and the IR transmitter is employed, both the IR receiver and the IR transmitter may be physically located either substantially close to one another or spaced apart in the remote control unit 20. The supplementary IR signals are typical device control signals transmitted from the plurality of devices to the remote control unit 20. Due to the nature of IR signals, there needs to be a direct unblocked path for transmission of the IR signals from each of the plurality of devices to the IR transceiver 24. The range of the supplementary IR signals would depend on an intensity of the supplementary IR signals.

During the process of receiving the supplementary IR signals into the remote control unit 20, the user input interface 22 may be used in a manner of, in any order, selecting a first control (for example, either virtual key or physical key) on the user input interface 22, and associating the received supplementary IR signals with the first control such that when the user actuates the first control, the received supplementary IR signals are transmitted as part of the master IR signals via the IR transceiver 24. The user may also use the user input interface 22 to input information relating to a source of the supplementary IR signals, which is useful for the generation of the look-up table 100 of FIG. 6.

Subsequently, the received supplementary IR signals are allocated (154) in at least one command field in each of a plurality of profiles. The number of profiles may be dependent on a capacity of the memory module 30, but there should be a minimum of five profiles. Allocating the received supplementary IR signals is performed using the user input interface 22 of the remote control unit such as, for example, a user definable touch screen interface (62 in FIG. 3), a pre-defined touch screen interface, a plurality of control keys (92 in FIG. 4, and 112 in FIG. 5) and the like. Each of the plurality of profiles includes a plurality of command fields associated with a plurality of commands for the associated device. The command fields 104 may be either pre-defined or defined by the user using the user input interface 22. The at least one command field may include, for example, power up, power down, play, stop, pause, volume increase, volume decrease, next track, previous track, fan speed increase, fan speed decrease, thermostat temperature increase, thermostat temperature decrease, channel increase, channel decrease, light intensity increase, light intensity decrease, and so forth.

Referring to FIG. 6, there is shown a sample look-up table 100 showing various profiles 102 stored in the memory module 30. There are four profiles shown in the look-up table 100, namely, "DVD Player", "Blu-Ray Player", "Air Conditioner", and "Fan". In this instance, the profiles are descriptive of the associated devices, and so are rather self explanatory. It should be appreciated that the profiles may known by numerals (for example, "1", "2", "3", "4"), alphabets (for example, "A", "B", "C", "D") or any other monikers. There are seven command fields 104 shown in the look-up table 100, namely, "Play", "Stop", "Next Track", "Power On", "Power Off", "Fan Speed Increase" and "Fan Speed Decrease". In the look-up table 100, a "√" indicates that the supplementary IR signal for a particular command for a particular device is stored in the remote control unit 20. Similarly, a "-" indicates that the supplementary IR signal for a particular command for a particular device is not stored in the remote control unit 20.

The method 150 includes storing the received supplementary IR signals in a memory module 30 of the remote control unit 20 (156). The memory module 30 is in a form of non-volatile memory and may be either a hard disk drive or a flash memory module. The memory module 30 may be either built into the remote control unit 20 or removable from the remote control unit 20. The supplementary IR signals are stored in the memory module 30 so that the supplementary IR signals can be replicated at a later juncture by the remote control unit 20. The supplementary IR signals may be stored in either modulated or demodulated form, whereby the supplementary IR signals are processed using a known code reduction algorithm.

Subsequently, the method 150 includes illuminating with an illumination beam from an illumination source 32 of the remote control unit 20, a location that the IR transceiver 24 of the remote control unit 20 is pointed at (158) with a visible indication. The visible indication is in a form of a boundary of illumination (72 in FIG. 3, 94 in FIGS. 4 and 124 in FIG. 5, expressed as solid lines to represent visible light). It should be appreciated that the boundary may be in the form of any shape, such as, for example, quadrilateral, circular, elliptical, star shaped, and so forth. An area bounded by the boundary of illumination (72 in FIG. 3, 94 in FIGS. 4 and 124 in FIG. 5, expressed as solid lines to represent visible light) may denote a field of coverage (74 in FIG. 3, 96 in FIGS. 4 and 126 in FIG. 5, expressed as dashed lines to represent non-visible infra-red) of the master IR signals.

The illumination source 32 may be either a bright LED source, or a visible laser source. The illumination source 32 should be able to provide the visible indication at a distance of at least five meters. The illumination source 32 is represented by 64 in FIG. 3, by 84 in FIG. 4 and by 114 in FIG. 5. The illumination source 32 is activated when the master IR signals are transmitted from the IR transceiver 24. Referring to FIGS. 3, 4 and 5, the illumination source 64, 84, 114 and the IR transceiver 66, 86, 116 respectively are adjacent and positioned substantially closely to one another. The illumination source 64, 84, 114 and the IR transceiver 66, 86, 116 are positioned substantially closely to one another such that their respective fields of coverage are similar (substantially overlapping). It should be appreciated that the illumination source 32 may be activated independently from the IR transceiver in a manner that the remote control unit 20 is usable as a pointer with reliance on the visible indication.

The method 150 then includes adjusting transmission of both the master IR signals and the illumination beam with an adjustable lens assembly 26 of the remote control unit 20 (160). It should be appreciated that the adjustable lens assembly 26 may include a plurality of interconnected assembly structures and there may be more than one lens in the assembly 26. The adjustable lens assembly 26 may be adjustable in a manner where a focusing lens 27 of the lens assembly is movable in a forwards and backwards direction. The adjustable lens assembly 26 may be adjustable either with or without assistance of an electric motor(s). The adjustable lens assembly 26 may also be controllable by the micro-controller 28. The adjustable lens assembly 26 may allow individual adjustment for each of the illumination source 32 and the IR transceiver 24. The transmission of both the master IR signals and the illumination beam is adjusted using the adjustable lens assembly 26 for varying the field of coverage (74 in FIG. 3, 96 in FIGS. 4 and 126 in FIG. 5, expressed as dashed lines to represent non-visible infra-red) of the master IR signals, with at least one of the plurality of devices within the field of coverage (74 in FIG. 3, 96 in FIGS. 4, and 126 in FIG. 5 expressed as dashed lines to represent non-visible infra-red) receiving the master IR signals.

Finally, the method 150 includes transmitting master IR signals through the IR transceiver 24 (162). The master IR signals transmitted from the IR transceiver 24 include stored supplementary IR signals from identical command fields for the plurality of devices. The identical command fields are determined by the micro-controller 28, the micro-controller 28 being any suitable data processing unit for controlling functions performed by the remote control unit 20. In this regard, with reference to FIG. 6, when a command "play" is actuated by the user via the user input interface 22, the remote control unit 20 transmits "play" commands meant for both the associated DVD player and the associated Blu-Ray player. Similarly, when a command "fan speed increase" is actuated by the user via the user input interface 22, the remote control unit 20 transmits "fan speed increase" commands meant for both the associated air conditioner and the associated fan. The stored supplementary IR signals in the master IR signals may be transmitted in a form such as, for example, sequentially with a time delay, sequentially without a time delay, altogether in a single transmission (single burst) and so forth.

In this regard, it is advantageous that the methods 40, 150 allow the user to control a plurality of devices using the remote control unit 20 which has stored the requisite supplementary IR signals in the memory module 30 without a necessity to personally identify each device on the remote control unit 20. All the user needs to do is to point the IR transceiver 24 of the remote control unit 20 in the direction of a device(s) which the user wishes to control and actuate a desired function on the user input interface 22 and the device(s) would respond in the desired manner. For example, the user only needs to actuate a command of "power on" once and a television, a television content decoder unit, a set of speakers, and an air-conditioning unit may all be powered on if the IR signal receivers of the aforementioned devices are located within the field of coverage (for example, 74 in FIG. 3, 96 in FIG. 4, and 126 in FIG. 5) of the remote control unit 20. It is evident that the remote control unit 20 provides convenience to the user as there's no necessity for the user to select a particular device to be controlled.

Whilst there has been described in the foregoing description preferred embodiments of the present invention, it will be understood by those skilled in the technology concerned that many variations or modifications in details of design or construction may be made without departing from the present invention.

The invention claimed is:

1. A remote control unit configurable to be used to control a plurality of devices, the remote control unit comprising including:
   a micro-controller for controlling functions performed by the remote control unit;
   an IR transceiver coupled to the micro-controller for both receiving supplementary IR signals and transmitting master IR signals;
   a memory module coupled to the micro-controller for storing the received supplementary IR signals in a plurality of profiles;
   a user input interface coupled to the micro-controller for both providing instructions to the micro-controller and for allocating the received supplementary IR signals in at least one command field in each of the plurality of profiles;
   an illumination source coupled to the micro-controller for providing a visible indication of a location that the IR transceiver is pointed towards, the illumination source being activated when the master IR signals are transmitted; and
   an adjustable lens assembly for adjusting transmission of both the master IR signals and an illumination beam from the illumination source;
   wherein the transmission of both the master IR signals and the illumination beam is adjusted for varying a field of coverage of the master IR signals, with at least one of the plurality of devices within the field of coverage receiving the master IR signals.

2. The remote control unit of claim 1, wherein the plurality of devices is selected from the group consisting of: televisions, air-conditioners, fans, VCRs, multimedia-content players/recorders, speakers, television content decoder units, PC-based entertainment units, gaming consoles and lighting devices.

3. The remote control unit of claim 1, wherein the visible indication is in a form of a boundary of illumination.

4. The remote control unit of claim 3, wherein an area bounded by the boundary of illumination denotes the field of coverage of the master IR signals.

5. The remote control unit of claim 1, wherein each of the plurality of profiles is associated with one of the plurality of devices.

6. The remote control unit of claim 5, wherein each of the plurality of profiles comprises includes a plurality of command fields associated with a plurality of commands for the associated device.

7. The remote control unit of claim 6, wherein the master IR signals comprise stored supplementary IR signals from identical command fields for the plurality of devices.

8. The remote control unit of claim 7, wherein the identical command fields are determined by the micro-controller.

9. The remote control unit of claim 7, wherein the stored supplementary IR signals in the master IR signals are transmitted in a form selected from the group consisting of: sequentially with a time delay, sequentially without a time delay, and altogether in a single transmission.

10. The remote control unit of claim 1, wherein the supplementary IR signals are transmitted from the plurality of devices.

11. The remote control unit of claim 1, wherein the user input interface is in a form selected from the group consisting of: a user definable touch screen interface, a pre-defined touch screen interface, and a plurality of control keys.

12. The remote control unit of claim 1, wherein the illumination source is able to provide the visible indication at a distance of at least five meters.

13. The remote control unit of claim 1, wherein the lens assembly is adjustable in a manner where a focusing lens of the lens assembly is movable in a forwards and backwards direction.

14. The remote control unit of claim 1, wherein the at least one command field is selected from the group consisting of: power up, power down, play, stop, pause, volume increase, volume decrease, next track, previous track, fan speed increase, fan speed decrease, thermostat temperature increase, thermostat temperature decrease, channel increase, channel decrease, light intensity increase, and light intensity decrease.

15. The remote control unit of claim 1, wherein the IR transceiver and the illumination source are adjacent to one another.

16. The remote control unit of claim 1, wherein the adjustable lens assembly comprises a plurality of interconnected assembly structures and more than one lens.

17. A method for using a remote control unit to control a plurality of devices, the method including:

receiving supplementary IR signals from the plurality of devices through an IR transceiver of the remote control unit;

allocating the received supplementary IR signals in at least one command field in each of a plurality of profiles;

storing the received supplementary IR signals in a memory module of the remote control unit;

transmitting master IR signals through the IR transceiver;

illuminating with an illumination beam from an illumination source of the remote control unit, a location that the IR transceiver of the remote control unit is pointed towards with a visible indication; and adjusting transmission of both the master IR signals and the illumination beam with an adjustable lens assembly of the remote control unit;

wherein the transmission of both the master IR signals and the illumination beam is adjusted for varying a field of coverage of the master IR signals, with at least one of the plurality of devices within the field of coverage receiving the master IR signals.

18. The method of claim 17, wherein the plurality of devices is selected from the group consisting of comprising: televisions, air-conditioners, fans, VCRs, multimedia-content players/recorders, speakers, television content decoder units, PC-based entertainment units, gaming consoles, and lighting devices.

19. The method of claim 17, wherein the visible indication is in a form of a boundary of illumination.

20. The method of claim 19, wherein an area bounded by the boundary of illumination denotes the field of coverage of the master IR signals.

21. The method of claim 17, wherein each of the plurality of profiles is associated with one of the plurality of devices.

22. The method of claim 21, wherein each of the plurality of profiles comprise a plurality of command fields associated with a plurality of commands for the associated device.

23. The method of claim 22, wherein the master IR signals comprise stored supplementary IR signals from identical command fields for the plurality of devices.

24. The method of claim 23, wherein the identical command fields are determined by a micro-controller of the remote control unit.

25. The method of claim 23, wherein the stored supplementary IR signals in the master IR signals are transmitted in a form selected from the group consisting of: sequentially with a time delay, sequentially without a time delay, and altogether in a single transmission.

26. The method of claim 17, wherein allocating the received supplementary IR signals is performed using a user input interface of the remote control unit in a form selected from the group consisting of: a user definable touch screen interface, a pre-defined touch screen interface, and a plurality of control keys.

27. The method of claim 17, wherein the illumination source is able to provide the visible indication at a distance of at least five meters.

28. The method of claim 17, wherein the lens assembly is adjustable in a manner where a focusing lens of the lens assembly is movable in a forwards and backwards direction.

29. The method of claim 17, wherein the at least one command field is selected from the group consisting of: power up, power down, play, stop, pause, volume increase, volume decrease, next track, previous track, fan speed increase, fan speed decrease, thermostat temperature increase, thermostat temperature decrease, channel increase, channel decrease, light intensity increase, and light intensity decrease.

30. The method of claim 17, wherein the adjustable lens assembly comprises a plurality of interconnected assembly structures and more than one lens.

* * * * *